United States Patent
Zhao et al.

(10) Patent No.: US 10,650,523 B2
(45) Date of Patent: May 12, 2020

(54) IMAGE SEGMENTATION METHOD, IMAGE SEGMENTATION SYSTEM AND STORAGE MEDIUM AND APPARATUS INCLUDING THE SAME

(71) Applicant: BOE Technology Group Co., Ltd., Beijing (CN)

(72) Inventors: Jibo Zhao, Beijing (CN); Xiaojun Tang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 165 days.

(21) Appl. No.: 15/750,410

(22) PCT Filed: Jul. 6, 2017

(86) PCT No.: PCT/CN2017/091986
§ 371 (c)(1),
(2) Date: Feb. 5, 2018

(87) PCT Pub. No.: WO2018/072483
PCT Pub. Date: Apr. 26, 2018

(65) Prior Publication Data
US 2019/0043199 A1 Feb. 7, 2019

(30) Foreign Application Priority Data
Oct. 17, 2016 (CN) .......................... 2016 1 0905435

(51) Int. Cl.
*G06T 7/11* (2017.01)
*G06T 7/73* (2017.01)
(Continued)

(52) U.S. Cl.
CPC ............ *G06T 7/11* (2017.01); *G06K 9/00355* (2013.01); *G06K 9/00375* (2013.01);
(Continued)

(58) Field of Classification Search
CPC .......... G06K 9/00355; G06K 9/00375; G06K 9/00389; G06K 9/3241; G06K 9/342;
(Continued)

(56) References Cited

U.S. PATENT DOCUMENTS

| 8,625,897 B2 | 1/2014 | Criminisi et al. |
| 2010/0166258 A1 | 7/2010 | Chai et al. |

(Continued)

FOREIGN PATENT DOCUMENTS

| CN | 102272773 A | 12/2011 |
| CN | 102831378 A | 12/2012 |

(Continued)

OTHER PUBLICATIONS

Machine translation of CN104217192 (Year: 2014).*

(Continued)

*Primary Examiner* — Katrina R Fujita
(74) *Attorney, Agent, or Firm* — Banner & Witcoff, Ltd.

(57) ABSTRACT

An image segmentation method, an image segmentation system, a storage medium and an apparatus including the image segmentation system or the storage medium are provided. The image segmentation method includes: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

18 Claims, 3 Drawing Sheets

(51) Int. Cl.
  *G06T 7/50* (2017.01)
  *G06K 9/00* (2006.01)
  *G06T 7/155* (2017.01)
  *G06T 7/194* (2017.01)
  *G06K 9/32* (2006.01)
  *G06T 7/62* (2017.01)
  *G06K 9/34* (2006.01)

(52) U.S. Cl.
  CPC ............ *G06K 9/3241* (2013.01); *G06T 7/155* (2017.01); *G06T 7/194* (2017.01); *G06T 7/50* (2017.01); *G06T 7/62* (2017.01); *G06T 7/73* (2017.01); *G06K 9/342* (2013.01); *G06T 2207/10028* (2013.01); *G06T 2207/20132* (2013.01); *G06T 2207/30196* (2013.01)

(58) Field of Classification Search
  CPC . G06T 7/11; G06T 7/155; G06T 7/194; G06T 7/50; G06T 7/62; G06T 7/73; G06T 2207/10028; G06T 2207/20132; G06T 2207/30196
  See application file for complete search history.

(56) References Cited

U.S. PATENT DOCUMENTS

| | | | |
|---|---|---|---|
| 2014/0056472 A1* | 2/2014 | Gu | G06K 9/00208 382/103 |
| 2014/0254919 A1* | 9/2014 | Sun | G06K 9/3233 382/154 |
| 2015/0117708 A1* | 4/2015 | Guigues | G06T 7/246 382/103 |
| 2015/0326845 A1* | 11/2015 | Liang | G06T 7/11 382/154 |

FOREIGN PATENT DOCUMENTS

| | | |
|---|---|---|
| CN | 102867311 A | 1/2013 |
| CN | 104217192 A | 12/2014 |
| CN | 104765440 A | 7/2015 |
| JP | 2014235743 A | 12/2014 |
| WO | 2010135617 A1 | 11/2010 |

OTHER PUBLICATIONS

Sep. 30, 2017—(WO) International Search Report and Written Opinion Appn PCT/CN2017/091986 with English Translation.

Lingfeng Luo, et al., "Gesture Reconition Using Depth Image", Institute of Information Science, Beijing Jiaotong University, Beijing, China, ICSP2014 Proceedings, pp. 751-755, 2014.

Gu De, et al., "Hand and Finger Tracking Based on Kinect Depth Information", Key Laboratory of Advanced Process Control for Light Industry Ministry of Education, Jiangnan University, Wuxi 214122, China, 5 pages.

Sep. 23, 2019—(CN) First Office Action Appn 201610905435.X with English Translation.

W. Wang, "Augmented Reality System Based on Range Image with Collision Interaction Between Virtual and Actual Objects", Apr. 2015, Beijing Forestry University, Master Thesis.

Z. Yang, "Research and Emulational Implementation on Range Image Segmentation Algorithm", with English Abstract, Mar. 2008, Harbin University of Science and Technology.

* cited by examiner

FIG. 13 ns method, an image
IMAGE SEGMENTATION METHOD, IMAGE SEGMENTATION SYSTEM AND STORAGE MEDIUM AND APPARATUS INCLUDING THE SAME The application is a U.S. National Phase Entry of International Application No. PCT/CN2017/091986filed on Jul. 6, 2017, designating the United States of America and claiming priority to Chinese Patent Application No. 201610905435.X filed on Oct. 17, 2016. The present application claims priority to and the benefit of the above-identified applications and the above-identified applications are incorporated by reference herein in their entirety.

TECHNICAL FIELD

Embodiments of the present disclosure relate to an image segmentation method, an image segmentation system, a storage medium and an apparatus including the image segmentation system or the storage medium.

BACKGROUND

With the development of human-computer interaction technology, the gesture recognition technology based on computer vision has become one of the important research directions in human-computer interaction technology because of its advantages of enabling human to interact with a computer in a natural way.

For example, gesture recognition may be applied to a smart device such as an AR eyeglass. By capturing an image including a human hand via a camera in the smart device, processing the image by a hand segmentation process to acquire an image only including the hand, and then analyzing the image only including the hand, the movement (namely, the gesture) of the hand or the information of a fingertip is obtained. In the process, the effect of the hand segmentation process directly affects the subsequent feature extraction and recognition accuracy.

SUMMARY

Embodiments of the present disclosure provide an image segmentation method, an image segmentation system, a storage medium and an apparatus including the image segmentation system or the storage medium, and the embodiments of the present disclosure obtain a high-quality image of a target object.

At least one embodiment of the present disclosure provides an image segmentation method, which includes: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

For example, the obtaining the connected region where the target object is located from the depth image includes: detecting all of connected regions in the depth image and a same parameter of each of the connected regions; and taking a connected region having a preset parameter as the connected region where the target object is located.

For example, the same parameter is a minimum depth value, and the preset parameter is a minimum depth value which is smallest among minimum depth values of the connected regions.

For example, the image segmentation method further includes: step S11, taking a preset pixel point in the depth image as an initial point and adding the preset pixel point to a preset queue; step S12, determining a neighboring pixel point that is spatially adjacent to the initial point; step S13, calculating an absolute value of a depth difference between the neighboring pixel point and the initial point, in which in a situation where the absolute value of the depth difference is smaller than or equal to a preset depth difference, the neighboring pixel point is added to a connected region where the initial point is located; step S14, taking the neighboring pixel point as a next initial point and adding the neighboring pixel point to the preset queue; and repeating the above step S12 to step S14 to determine the connected region where the initial point is located.

For example, the preset depth difference is from 10 mm to 15 mm.

For example, the acquiring the image of the target object includes: determining a variation trend of pixel-point numbers respectively at a plurality of positions in the connected region along the principal direction, in which pixel points at each of the plurality of positions are sequentially arranged along the secondary direction of the connected region, and the secondary direction is perpendicular to the principal direction; comparing the variation trend with a variation trend of the morphology of the target object along the principal direction; and determining a segmentation position for acquiring the image of the target object in the connected region according to a comparison result.

For example, the acquiring the image of the target object includes: determining a real width of the connected region along the secondary direction at each of a plurality of positions, in which the secondary direction is perpendicular to the principal direction, the plurality of positions are sequentially arranged along the principal direction, and pixel points at each of the plurality of positions are sequentially arranged along the secondary direction; and comparing the real width with a reference width to determine a segmentation position for acquiring the image of the target object in the connected region.

For example, the target object is a human hand, and the reference width is from 40 mm to 100 mm.

For example, according to a number of the pixel points at each of the plurality of positions, an average depth value of the pixel points at each of the plurality of positions, and a focal distance ratio of a camera for acquiring the depth image, the real width of the connected region at each of the plurality of positions is determined.

For example, the acquiring the image of the target object further includes: determining a real distance from each of the plurality of positions to a vertex of the connected region; and comparing the real distance with a reference length to determine the segmentation position.

For example, the target object is a human hand, and the reference length is from 40 mm to 200 mm.

For example, according to a difference between average depth values of and a real distance along the principal direction of each group of two adjacent ones of the positions between each of the plurality of positions and the vertex of the connected region, a real distance from each of the plurality of positions to the vertex of the connected region is determined.

For example, the acquiring the image of the target object further includes: obtaining a plurality of reference positions among the plurality of positions; calculating a difference between coordinates of two pixel points which are farthest away from each other at each of the reference positions; and determining the segment position according to a size relationship between the difference of the coordinates and a number of pixel points at each of the reference positions.

For example, the plurality of reference positions include a first reference position and a second reference position, a difference between coordinates of two pixel points farthest away from each other at the first reference position is $\Delta X1$ which is greater than 0, a number of pixel points at the first reference position is N1, and in a situation where ($\Delta X1-N1$)/N1 is smaller than or equal to a preset value which is from 10% to 15%, the first reference position is taken as the segmentation position.

For example, a difference between coordinates of two pixel points farthest away from each other at the second reference position is $\Delta X2$ which is greater than 0, a number of pixel points at the second reference position is N2, and in a situation where ($\Delta X2-N2$)/N2 is greater than the preset value, a distance from the segmentation position to the second reference position is greater than a preset distance, and the preset distance is from 24 mm to 26 mm.

At least one embodiment of the present disclosure further provides an image segmentation system which includes: a first image segmentation device configured to process a depth image to obtain a connected region where a target object is located from the depth image; an analysis device connected to the first image segmentation device and configured to determine a principal direction or a secondary direction of the connected region acquired by the first image segmentation device by a principal component analysis method; and a second image segmentation device connected to the analysis device and configured to acquire an image of the target object from the connected region according to relationship between morphology of the target object and the principal direction or the secondary direction.

For example, the second image segmentation device includes: a calculator device connected to the and configured to calculate pixel-point numbers respectively at a plurality of positions in the connected region and to determine a variation trend of the point-pixel numbers along the principal direction, in which pixel points at each of the plurality of positions are sequentially arranged along the secondary direction of the connected region, and the secondary direction is perpendicular to the principal direction; and a comparison device connected to the calculator device and configured to compare the variation trend with a variation trend of the morphology of the target object along the principal direction, to determine a segmentation position for acquiring the image of the target object in the connected region.

For example, the second image segmentation device includes: a calculator device connected to the analysis device and configured to calculate a real width of the connected region along the secondary direction at each of a plurality of positions, in which the secondary direction is perpendicular to the principal direction, the plurality of positions are sequentially arranged along the principal direction, and the pixel points at each of the plurality of positions are sequentially arranged along the secondary direction; and a comparison device connected to the calculator device and configured to compare the real width with a reference width to determine a segmentation position for acquiring the image of the target object in the connected region.

For example, the calculator device is further configured to calculate a real distance from each of the plurality of positions to a vertex of the connected region, and the comparison device is further configured to compare the real distance with a reference length to determine the segmentation position.

At least one embodiment of the present disclosure further provides an image segmentation system which includes: a processor; a memory; and a computer program instruction stored in the memory, in which the computer program instruction executes following steps in a situation where the computer program instruction is executed by the processor: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

At least one embodiment of the present disclosure further provides a storage medium in which a computer program instruction is stored, the computer program instruction is adapted to be loaded and executed by a processor to execute following steps: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

At least one embodiment of the present disclosure further provides an apparatus which includes the image segmentation system described in any one of the above embodiments or the storage medium described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide an image segmentation method, an image segmentation system, a storage medium and an apparatus including the image segmentation system or the storage medium. In the image segmentation method provided by the embodiments of the present disclosure, by obtaining a connected region where a target object is located from a depth image, afterwards determining a principal direction or a secondary direction of the connected region by a principal component analysis method, and then acquiring an image of the target object from the connected region according to relationship between morphology of the target object and the principal direction or the secondary direction, the image of the target object is obtained from the depth image, and the obtained image of the target object is of high quality.

For example, the embodiments of the present disclosure are used for hand segmentation in gesture recognition. In this case, the target object is a human hand, and the embodiments of the present disclosure acquire a high-quality image of the hand, so the scanning range and the error rate of fingertip extraction are reduced, and accurate test samples for machine learning based gesture recognition are provided. The embodiments of the present disclosure are also applicable for any other image segmentation application besides the gesture recognition. The embodiments of the present disclosure are described by taking the embodiments being used for the hand segmentation in the gesture recognition as an example only.

Figure 1:
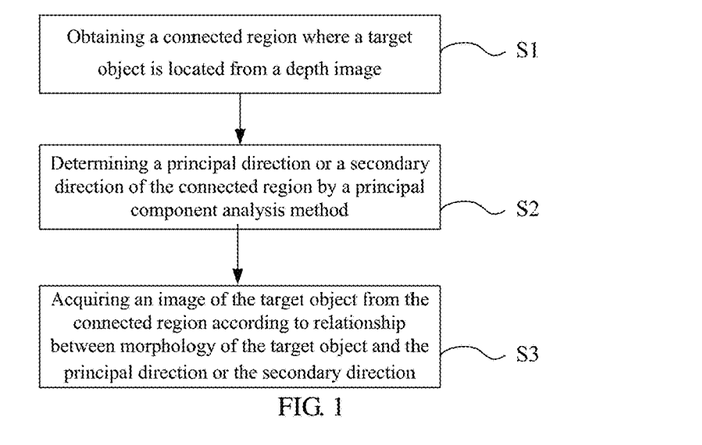
FIG. 1 is a flowchart of an image segmentation method according to embodiments of the present disclosure.

As illustrated in FIG. 1, at least one embodiment of the present disclosure provides an image segmentation method, which includes: step S1, obtaining a connected region where a target object is located from a depth image; step S2, determining a principal direction or a secondary direction of the connected region by a principal component analysis method; and step S3, acquiring an image of the target object from the connected region according to relationship between morphology of the target object and the principal direction or the secondary direction.

The obtaining of the connected region where the target object is located from the depth image described in step S1 will be described in detail below with reference to FIG. 2 to FIG. 5.

In step S1, the depth image is a two-dimensional depth image obtained by a depth camera, and a value of each pixel point in the two-dimensional depth image is a distance from an object that the pixel point represents to the depth camera (namely, the value of each pixel point in the two-dimensional depth image is a depth value) and is, for example, expressed in millimeters (mm). It should be noted that in a situation where a certain pixel point in the depth image does not correspond to an object, the depth value of the pixel point is represented by 0. For a non-zero depth value, the greater the depth value, the farther the object that the pixel point having the non-zero depth value represents is from the depth camera.

The resolution of the depth image is set according to actual needs, and is not limited here. For example, the resolution of the depth image is 320×240. For example, in order to simplify the calculation, the resolution of the depth image is reduced, for example, to 160×120.

In step S1, the connected region is formed by a plurality of pixel points connected to each other, that is, each pixel point in the connected region and a neighboring pixel point spatially adjacent to the pixel point satisfy a similarity rule. For example, the similarity rule is that an absolute value of a depth difference between each pixel point and the neighboring pixel point is smaller than or equal to a preset depth difference. For example, in a case where no abrupt change occurs between depth values of pixel points which are related to the target object and are spatially adjacent to each other, the preset depth difference is from 10 mm to 15 mm, so as to obtain a high-quality connected region of the target object. For example, the target object is a human hand, and there is generally no abrupt change between depth values of pixel points spatially adjacent to each other for the connected region of the hand. Therefore, setting the preset depth difference to be from 10 mm-15 mm is advantageous for obtaining a high-quality connected region of the hand. The embodiments of the setting of the depth difference include but are not limited to 10 mm to 15 mm.

The two pixel points spatially adjacent to each other are described below with reference to FIG. 2.

Figure 2:
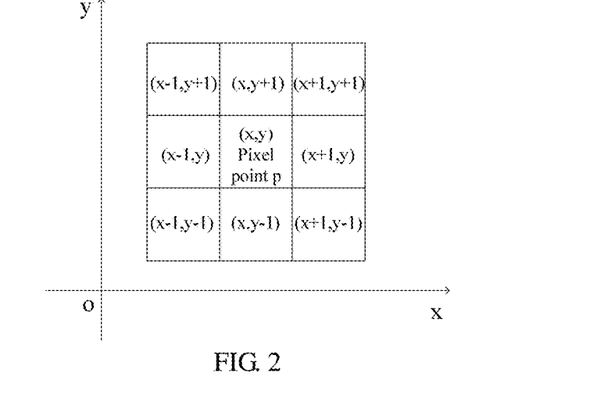
FIG. 2 is a schematic diagram illustrating distribution of pixel point p and its neighborhoods in a depth image according to the embodiments of the present disclosure.

For example, as shown in FIG. 2, taking the pixel point p with a coordinate (x, y) in the xoy coordinate system as an example, in horizontal and vertical directions, the pixel point p has four neighboring pixel points spatially adjacent to the pixel point p, that is, the pixel point with coordinate (x, y+1) which is directly above the pixel point p, the pixel point with coordinate (x, y−1) which is directly below the pixel point p, the pixel point with coordinate (x−1, y) which is on the left of the pixel point p and the pixel point with coordinate (x−1, y) which is on the right of the pixel point p, and the four neighboring pixel points in the horizontal and vertical directions form the 4 neighborhoods of the pixel point p. In diagonal directions, the pixel point p has 4 neighboring pixel points spatially adjacent to the pixel point p, that is, the pixel point with coordinate (x−1, y+1) which is on the upper left of the pixel point p, the pixel point with coordinate (x+1, y+1) which is on the upper right of the pixel point p, the pixel point with coordinate (x−1, y−1) which is on the lower left of the pixel point p and the pixel point with coordinate (x+1, y−1) which is on the lower right of the pixel point p and the four neighboring pixel points in the diagonal directions form diagonal neighborhoods of the pixel point p. In addition, the four neighborhoods and the diagonal neighborhoods constitute the eight neighborhoods of the pixel point p. The pixel point p is spatially adjacent to each pixel point of its four neighborhoods, diagonal neighborhoods, and eight neighborhoods.

For example, in a situation where the depth image includes a plurality of objects and the target object among the plurality of objects is closest to the depth camera, the obtaining the connected region where the target object is located from the depth image in step Si includes: detecting all of connected regions in the depth image and a same parameter of each of the connected regions; and taking a connected region having a preset parameter as the connected region where the target object is located.

For example, the same parameter is a minimum depth value, and the preset parameter is a minimum depth value which is smallest among minimum depth values of the connected regions. That is to say, the obtaining the connected region where the target object is located from the depth image in step Si includes: detecting all of the connected regions in the depth image and the same parameter of each of the connected regions; and taking a connected region having a smallest minimum depth value as the connected region where the target object is located. It should be noted that, the minimum depth value of each connected region is a non-zero depth value of a pixel point having a smallest depth value among all the pixel points in the connected region.

Figure 3A:
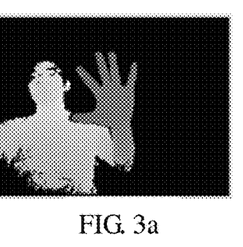
FIG. 3a schematically illustrates a depth image captured in a situation where a depth camera faces front of a user in the embodiments of the present disclosure.
Figure 3B:
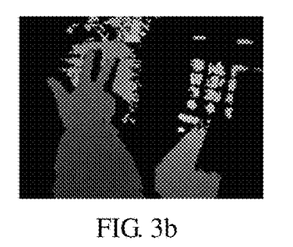
FIG. 3b schematically illustrates a depth image captured in a situation where the depth camera oriented in a same direction as the front of the user in the embodiments of the present disclosure.

For example, the target object is the human hand. FIG. 3a shows a depth image taken with a depth camera facing the front of a user; and FIG. 3b shows a depth image taken in a situation where the depth camera and the front of the user have a same orientation. As shown in FIG. 3a and FIG. 3b, the depth image generally includes a plurality of connected regions; and the hand is closest to the depth camera, so the connected region where the hand is located is a connected region with a smallest depth value in the depth image. Accordingly, for example, all the connected regions in the depth image and the minimum depth value of each connected region are detected, and then the connected region having the smallest minimum depth value is taken as the connected region where the hand is located. For example, for the depth image shown in FIG. 3b, the acquired connected region where the hand is located is shown in the image of the hand in FIG. 4.

In other embodiments, for example, the connected region where the target object is located is obtained according to any other parameter of the connected region (such as the contour shape, length, area of region or the like of the connected region) except for the minimum depth value.

For example, the image segmentation method provided by at least one embodiment of the present disclosure includes the following steps S11 to S14, which are described in detail below.

Step S11: taking a preset pixel point in the depth image as an initial point and adding the preset pixel point to a preset queue.

For example, in step S11, the preset pixel point is selected by a processor who processes the depth image or is determined by an image processing algorithm.

For example, in step S11, the preset queue is an FIFO (First Input First Output) queue, that is, a first-in first-out queue. In the queue, a first-entered instruction is completed and then retires before executing a second instruction, and so on.

Step S12: determining a neighboring pixel point that is spatially adjacent to the initial point.

For example, in the step S12, four neighborhoods or eight neighborhoods of the initial point are detected to determine the neighboring pixel point that is spatially adjacent to the initial point.

Step S13: calculating an absolute value of a depth difference between the neighboring pixel point and the initial point, in which in a situation where the absolute value of the depth difference is smaller than or equal to a preset depth difference, the neighboring pixel point is added to a connected region where the initial point is located.

For example, in step S13, the preset depth difference is from 10 mm to 15 mm, for example, 10 mm, 13 mm or 15 mm, or the like.

Step S14: taking the neighboring pixel point as a next initial point and adding the neighboring pixel point to the preset queue for a subsequent detection of neighborhoods of the neighboring pixel point.

The above step S12 to step S14 are repeated until each pixel point in the preset queue is processed, so as to determine the connected region where the initial point is located. After all the connected regions in the depth image are detected in a similar way, the connected region with the smallest minimum depth value is selected to serve as the connected region where the target object is located.

Figure 4:
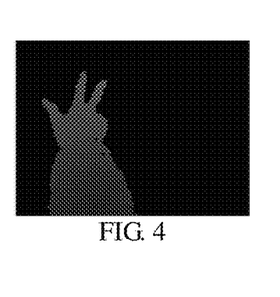
FIG. 4 is a schematic view of a connected region where a hand is located according to the embodiments of the present disclosure.
Figure 5:
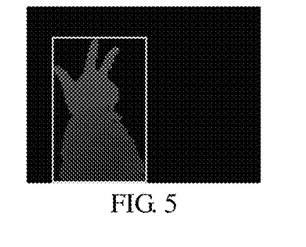
FIG. 5 schematically illustrates a boundary of the connected region where the hand is located according to the embodiments of the present disclosure.

For example, after obtaining the connected region where the target object is located, in order to simplify the subsequent calculation, the depth values of other pixel points in the depth image except the pixel points in the connected region where the target object is located are set to a null value of 0. Taking the target object being the human hand as an example, as shown in FIG. 4, the depth values of the remaining pixel points are set to 0 except for the pixel points in the connected region where the hand is located.

For example, during detecting all the connected regions in the depth image, upper, lower, left and right boundaries of each connected region are also detected, and then the connected region where the target object is located is selected; or, after detecting the connection region where the target object (for example, the hand) is located, the boundaries of the connected region where the target object (for example, the hand) is detected. Taking the target object being the human hand as an example, for example, the boundaries of the connected region where the target object is located is shown by the white rectangle in FIG. 5. In order to simplify the subsequent calculation, for example, the calculation in subsequent steps are performed only within the boundaries of the connected region where the target object is located, without the need of processing the pixel points in the entire depth image.

The determination of the principal direction or the secondary direction of the connected region by the principal component analysis method described in step S2 will be described in detail below.

The principle component analysis (PCA) method is a multivariate statistical analysis method that transforms data into a new coordinate system by linear transformation so that the variance of the data on the first coordinate axis is largest, the variance of the data on the second coordinate axis is second largest, and so on. In the method, the direction of the first coordinate axis is the principal direction (that is, the principal direction is the direction with the largest variance of the data) and the direction of the other coordinate axis are the secondary direction (the secondary direction is the direction with the variance of the data is not the largest).

Figure 6:
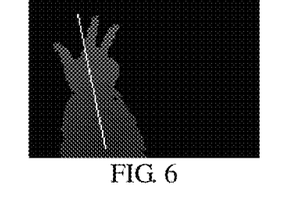
FIG. 6 schematically illustrates a principal direction of the connected region where the hand is located according to the embodiments of the present disclosure.

For example, taking the target object being a human hand as an example, the principal direction obtained by the PCA method of the connected region acquired in step S1 is shown by a white straight line in FIG. 6.

In the following, the acquiring the image of the target object from the connected region according to the relationship between the morphology of the target object and the principal direction or the secondary direction in step S3 will be described in detail For example, the morphology of the target object is a contour shape, a variation trend of a contour, a size, an area of region, or other parameter of the target object or an object including the target object. Taking the target object being a human hand as an example, for example, the morphology of the hand is a variation trend of a contour that gradually narrows from a forearm to a wrist of the hand and gradually widens from the wrist of the hand to a palm of the hand. Therefore, for example, a wrist position is taken as a segmentation position for obtaining an image of the hand from the connected region and removing an image of the arm. In the case that the target object is another object, a suitable segmentation position may be found according to the specific shape of the object. For example, the target object is a human head, and the morphology of the human head is a contour shape of the human head, a variation trend of a contour, a length or an area of region because there are obvious differences between the human head and a part of a human body below the human head in the contour shape, in the variation trend of the contour, in the length and in the area of region.

Taking the target object being a human head as an example, the relationship between the morphology of the target object and the secondary direction is, for example, a shoulder of the human body has a largest width in the secondary direction which is a direction from a left hand side to a right hand side of the human body. Therefore, for example, the shoulder serves as a segmentation position for obtaining an image of the human head from a connected region where the human body is located.

For example, the target object is the human hand, the image of the target object is acquired from the connected region where the target object is located according to the relationship between the morphology of the target object and the principal direction, and the step S3 will be described in detail below.

Based on the above finding that the morphology of the human hand gradually narrows from the forearm to the wrist and gradually widens from the wrist to the palm, for example, the acquiring the image of the target object includes: determining a variation trend of pixel-point numbers respectively at a plurality of different positions in the connected region where the target object is located along the principal direction, in which pixel points at each of the plurality of positions are sequentially arranged along the secondary direction of the connected region, and the secondary direction is perpendicular to the principal direction; comparing the variation trend with a variation trend of the morphology of the target object along the principal direction; and determining a segmentation position for acquiring the image of the target object in the connected region according to a comparison result. The variation trend of pixel-point numbers respectively at the plurality of different positions reflects the variation trend of the morphology of the target object along the principal direction, so a suitable segmentation position is determined, for example, by comparing the two variation trends, so as to obtain the image only including the target object from the connected region where the target object is located according to the segmentation position.

The variation trend of the pixel-point numbers along the principal direction does not reflect an actual width of the connected region. In order to determine the segmentation position more accurately, for example, in at least one embodiment, the acquiring the image of the target object in the step S3 includes: determining a real width of the connected region along the secondary direction at each of the plurality of positions, in which the secondary direction is perpendicular to the principal direction, the plurality of positions are sequentially arranged along the principal direction, and pixel points at each of the plurality of positions are sequentially arranged along the secondary direction; and comparing the real width with a reference width to determine the segmentation position for acquiring the image of the target object in the connected region.

For example, the variation trend of the pixel-point numbers along the principal direction is determined at first, and then the real width of the connected region at each of the plurality of positions is calculated to determine the segmentation position. Alternatively, for example, the determination of the variation trend of the pixel-point numbers along the principal direction is omitted, the width variation trend of the connected region along the principal direction is determined according to real widths of the connected region respectively at the plurality of positions, and a position having a real width within a range of the reference width is selected from the plurality of positions, so as to determine the segmentation position.

For example, in a situation where the target object is a human hand, a width of the wrist is from 40 mm to 100 mm, so the reference width is from 40 mm to 100 mm, for example, 40 mm, 60 mm, 80 mm or 100 mm. For example, according to the number of the pixel points at each of the plurality of positions, an average depth value of the pixel points at each of the plurality of positions, and a focal distance ratio of a camera for acquiring the depth image, the real width of the connected region at each of the plurality of positions is determined.

For example, in order to determine the segmentation position more accurately, the acquiring the image of the target object in the step S3 further includes: determining a real distance from each of the plurality of positions to a vertex of the connected region; and comparing the real distance with a reference length to determine the segmentation position. It should be noted that, for example, the vertex of the connected region is determined according to the position relationship between the coordinate of the vertex and the principal direction.

For example, in a situation where the target object is a human hand, the reference length is from 40 mm to 200 mm because a length of the human hand (a length from a fingertip to the wrist) is, for example, from 40 mm to 200 mm. For example, in the case where the real width is within the range of the reference width, a position having a real distance within a range of the reference length serves as the segmentation position.

For example, according to a difference between average depth values of and a real distance along the principal direction of each group of two adjacent ones of the positions between each of the plurality of positions and the vertex of the connected region, a real distance from each of the plurality of positions to the vertex of the connected region is determined.

For example, the target object is the human hand, and the acquiring the image of the target object in the step S3 includes, for example, the flowing step S31 to step S35, which will be described in detail below with reference to FIG. 7 to FIG. 10.

Figure 7:
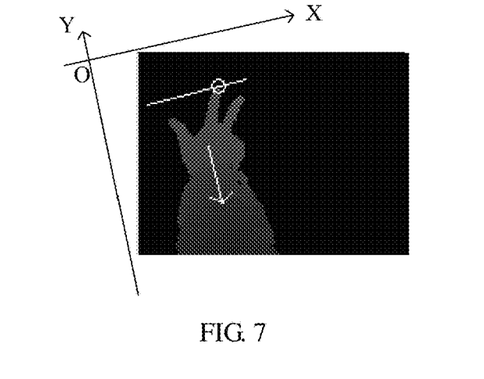
FIG. 7 is a schematic view of a new coordinate system obtained by rotating a coordinate system of the depth image according to the principal direction of the connected region where the hand is located in the embodiments of the present disclosure.

Step S31: determining pixel-point numbers respectively at a plurality of different positions in the connected region where the hand is located, the plurality of different positions are arranged sequentially along the principal direction, pixel points at each of the plurality of positions are sequentially arranged along the secondary direction of the connected region, and the secondary direction is perpendicular to the principal direction;

For example, in order to simplify the calculation of the data, after determining the principal direction (for example, defining the principal direction roughly from up to down as shown by the white arrow in FIG. 7) of the connected region where the hand is located, the original coordinate system of the depth image is rotated based on the principal direction until the Y axis of the new coordinate system (referring to the rectangular coordinate system XOY shown in FIG. 7) of the depth image is parallel to the principal direction (for example, the Y axis is oriented in the same direction as or opposite to the principal direction). In this way, the X axis is parallel to the above secondary direction (as shown by the white line in FIG. 7), and all the pixel points in the original depth image are given a new coordinate value under the new coordinate system.

Based on the new coordinate system, in a situation where the direction of the Y axis is opposite to the principal direction as shown in FIG. 7, starting from a pixel point having the largest Y coordinate (that is, the vertex of the connected region, as indicated by a circle in FIG. 7) and orientating to a direction that the Y coordinate reduces (as shown by the direction of the arrow), the numbers of pixel points having a Y coordinate of Y=k are counted sequentially, for example, k=k0, k0−1, k0−2, . . . , in which k0 is the Y coordinate of the vertex of the connected region. That is to say, the number of pixel points at the first position Y=k0, the number of pixel points at the second position Y=k0−1, and the number of pixel points at the third position Y=k0−2, and so on are sequentially counted, so that the variation trend of the pixel-point numbers respectively at the plurality of different positions along the Y axis (namely, along the principal direction) is obtained. After counting the pixel-point numbers at all the positions that meet Y=k in the direction of the arrow in the connected region, the pixel-point numbers at these positions are stored in an array disData(k). The array disData(k) represents a pixel-point number at a position Y=K in the connected region where the hand is located. For example, disData(k0) represents a pixel-point number at a position Y=k0, disData(k0−1) represents a pixel-point number at a position Y=k0−1, and so on.

In short, the array disData(k) represents the width variation trend of the connected region where the hand is located in the two-dimensional depth image along the principal direction. According to the width variation trend, along with the variation trend of the morphology of the human hand along the principal direction, a basis is provided to the determining of the wrist and the removing of the arm.

Step S32: determining a real width of the connected region where the hand is located along the secondary direction at each of the plurality of positions The disData(k) obtained by step S31 represents the variation of the pixel-point numbers at different positions along the principal direction, and disData(k) does not reflect the real width of the connected region where the hand is located. Therefore, in order to determine the wrist position more accurately, a real width of the connected region where the hand is located at the position Y=k is calculated.

For example, in order to calculate the real width of the connected region where the hand is located at the position Y=k, an average of the depth values (namely an average depth value) of all the pixel points at the position Y=k in the connected region where the hand is located is calculated and the calculated average depth value is stored in the array aveDepth(k). The array aveDepth(k) represents the average depth value of the pixel points at the position Y=k in disData(k). For example, the average depth value is used to approximately represent the average distance from the pixel points at the position Y=k to the camera. Afterwards, the real width of the connected region where the hand is located at the position Y=k is calculated according to the following formula realDis(k):

$$realDis(k) = \frac{disData(k) \times aveDepth(k)}{ratio}.$$

The realDis(k) is in millimeters (mm). It should be noted that the "ratio" is the camera's focal distance ratio and is determined according to the camera itself.

It can be seen from the formula realDis(k) that, the real width realDis(k) of the connected region at each of the plurality of positions is determined according to the number disData(k) of the pixel points at each of the plurality of positions, the average depth value aveDepth(k) of the pixel points at each of the plurality of positions, and the focal distance ratio "ratio" of the camera for acquiring the depth image, which are obtained in step S31.

For example, the real width of the connected region at the position Y=k0−1 is calculated via realDis(k0−1), the real width of the connected region at the position Y=k0−2 is calculated via realDis(k0−2), and so on, so that the variation of the real widths of the target object along the principal direction is obtained.

Step S33: determining a real distance from each of the plurality of positions to the vertex of the connected region.

In order to further accurately obtain the wrist position, for example, an array realLenth(n) representing the real length is obtained in this step S33 after obtaining the array realDis(k) representing the real width in step S32. The realLength(n) represents the real distance from the position Y=k=k0−n to the position Y=k0 (that is, the vertex of the connected region), and the real distance is a 3D distance, that is, the distance in the 3-dimensional space. That is, starting from the vertex of the connected region, the real distance corresponding to the length n along the principal direction in the depth image is realLength(n), where n=k0−k0=0 and real- Lenth(0)=0 at the position Y=k0. The following describes how to calculate realLength(n).

The real distance dy(k) (the distance is a 2D distance) along the principal direction between two adjacent positions Y=k and Y=k−1 is calculated:

$$dy(k) = \frac{(Y(k) - Y(k-1)) \times aveDepth(k)}{ratio},$$

in which, Y(k) and Y(k−1) respectively represent the Y coordinates of two adjacent pixel points located along the principal direction in the new coordinate system, that is, Y(k) is the Y coordinate of the pixel point at the position Y=k, and Y(k−1) is the Y coordinate of the pixel point at the position Y=k−1.

Due to the fact that the calculated real length of the hand is greatly affected by the depth variation, the calculation method of the real length of the connected region where the hand is located is different from the calculation method of the real width of the connected region where the hand is located. Therefore, the difference between the average depth values of two adjacent positions Y=k and Y=k−1 is needed to be calculated, that is, the z-axis difference dz(k):

$$dz(k) = aveDepth(k) - aveDepth(k-1).$$

Afterwards, the real distance from each of the plurality of positions in the connected region to the vertex of the connected region, namely each element in the array realLenth(n), is calculated via the following formula:

$$realLenth(n) = \sum_{0}^{n} \sqrt{dy(k)^2 + dz(k)^2},$$

in which, $n=k0-k$.

It can be seen from the above formula of realLenth(n) that, according to the difference dz(k) between average depth values of and the real distance dy(k) along the principal direction of each group of two adjacent ones of the positions between each of the plurality of positions and the vertex of the connected region, the real distance realLenth(n) from each of the plurality of positions to the vertex of the connected region is determined; and it can be seen from the above formula dy(k) that the real distance dy(k) along the principal direction of each group of two adjacent positions is determined according to the average depth value aveDepth(k) of the pixel points at each position and the focal distance ratio "ratio" of the camera for acquiring the depth image.

Step S34: comparing the real width at each position obtained in step S32 with the reference width of the hand, taking into account of the width variation trend of connected region along the principal direction (for example, the width variation trend is determined according to the pixel-point numbers obtained in step S31 or the real widths respectively at the positions obtained in the step S32), and comparing the real distance from each position to the vertex of the connected region obtained in the step S33 with the reference length of the hand, so as to determine the wrist position (an example of the segmentation position).

For example, the reference width of the wrist is from 40 mm to 100 mm, for example, 40 mm, 80 mm or 100 mm. For example, the reference length of the hand is from 40 mm to 200 mm.

Figure 8:
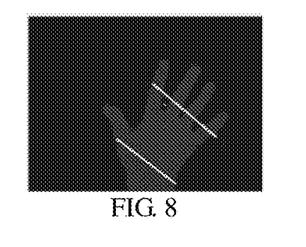
FIG. 8 is a schematic view of a plurality of reference positions in the embodiments of the present disclosure.

In at least one embodiment, it is possible to obtain a plurality of positions satisfying the wrist conditions (hereinafter referred to as reference positions) within the range of the reference length and the range of the reference width of the hand. For example, as shown in FIG. 8, the reference position indicated by the upper white line is not suitable as the segmentation position; the reference position indicated by the lower white line below is suitable as the segmentation position; and both of the reference positions have a width close to the wrist width, satisfy the characteristic that the width of the connected region widens from the part of the connected region below each of the reference positions to the part of the connected region above each of the reference positions, and have a segmentation length within the range from the minimum value of the hand to the maximum value of the hand. In this case, a segmentation error may occur, for example, it is possible to get only 4 fingers according to the upper reference position in FIG. 8.

In research, the inventors of the present application found that, for a human hand, there is a null value between a part of adjacent pixel points at a reference position unsuitable as a segmentation position (for example, the upper reference position in FIG. 8); thus, during calculating the number of pixel points, at the reference position unsuitable as the segmentation position, the difference (which is a positive value) obtained by subtracting the coordinates of two furthest pixel points in the connected region where the hand is located is significantly greater than the number of the pixel points at the reference position; and at the reference position suitable as the segmentation position (as shown by the lower reference position in FIG. 8), the difference obtained by subtracting the coordinates of the two pixel points farthest apart in the connected region where the hand is located is roughly equal to the number of the pixel points at the reference position.

Based on the above finding, in at least one embodiment of the present disclosure, the acquiring the image of the target object in the step S3 further includes: obtaining a plurality of reference positions among the plurality of positions; calculating a difference (the difference is positive value) between coordinates of two pixel points which are farthest away from each other at each of the reference positions; and determining the segment position according to a size relationship between the difference of the coordinates and the number of pixel points at each of the reference positions.

For example, the plurality of reference positions include a first reference position and a second reference position, a difference between coordinates of two pixel points farthest away from each other at the first reference position is ΔX1 (ΔX1 is greater than 0), the number of pixel points at the first reference position is N1, and in a situation where (ΔX1−N1)/N1 is smaller than or equal to a preset value which is from 10% to 15%, the first reference position is taken as the segmentation position. In this way, the segmentation position is selected from the first reference position and the second reference position. For example, in this way, the lower reference position in FIG. 8 is determined to be the segmentation position and the upper reference position in FIG. 8 is determined to be not suitable as the segmentation position. The embodiments of the preset value include, but are not limited to, 10% to 15%, and may be set according to actual needs.

In the research, the inventors of the present application also found that, for a human hand, in a situation where at least three reference positions are obtained, for example, the first reference position, the second reference position and a third reference position, after the second reference position is determined to be not suitable as the segmentation position according to the size relationship between the difference of the coordinates and the number of pixel points, and in a case that the distance between the third reference position and the second reference position along the principal direction is smaller than or equal to a preset distance (for example, 24 mm-26 mm), the third reference position is also not suitable as a segmentation position.

In other words, in at least one embodiment of the present disclosure, for the second reference position unsuitable as the segmentation position, a difference between coordinates of two pixel points farthest away from each other at the second reference position is $\Delta X2$ ($\Delta X2$ is greater than 0), the number of pixel points at the second reference position is N2, and in a situation where $(\Delta X2-N2)/N2$ is greater than the above preset value (for example, greater than 15%) and where the distance from the third reference position (the third reference position is between the vertex of the connected region and the second reference position or is at a side of the second reference position away from the vertex of the connected region) to the second reference position is smaller than or equal to the preset distance, the third reference position is not selected to be the segmentation position, namely the distance from an appropriate segmentation position to the second reference position is greater than the preset distance. For example, in a situation where the target object is the human hand, the preset distance is from 24 mm to 26 mm, for example, 24 mm, 25 mm or 26 mm.

Figure 9:
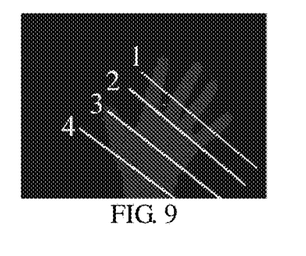
FIG. 9 is another schematic view of a plurality of reference positions in the embodiments of the present disclosure.

Taking FIG. 9 as an example, four reference positions are shown in FIG. 9, the four reference positions are sequentially numbered from top to bottom as 1, 2, 3, and 4, reference positions 1 to 3 are not suitable for serving as the segmentation position, and reference position 4 is used as the segmentation position. In determining the segmentation position, for example, the reference positions are sequentially evaluated in the principal direction (namely, starting from the vertex of the connected region). For example, it is determined that the reference position 1 is not suitable as the segment position according to the size relationship between the number of pixel points and the difference between the coordinates of the pixel points; then, it is determined that the reference position 2 is not suitable as the segmentation position based on the size relationship between the distance from the reference position 2 to the reference position 1 and the preset value; and afterwards, it is judged that the reference position 3 is not suitable as the segmentation position according to the size relationship between the difference of coordinates and the number of pixel points, and thus it is obtained that the reference position 4 is suitable as the segmentation position.

Figure 10:
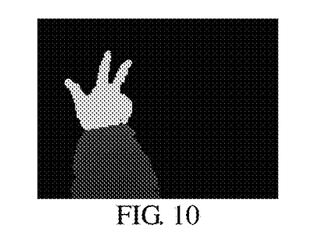
FIG. 10 is a schematic view illustrating an image of a hand obtained according to the embodiments of the disclosure.

Step S35: after the wrist position is determined by step S34, acquiring the image of the hand from the connected region where the hand is located and removing the image of the arm according to the wrist position. For example, a relatively good image of the hand shown in FIG. 10 is obtained.

Figure 11:
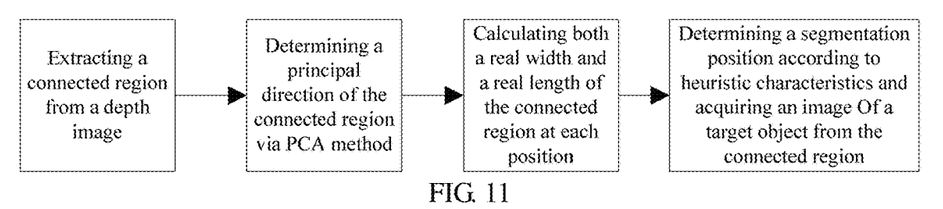
FIG. 11 is a flowchart of an image segmentation method according to the embodiments of the present disclosure.

To sum up, for the connected region where the hand is located, for example, a flow chart of the method provided by at least one embodiment of the present invention is summarized as FIG. 11, that is, the method includes: extracting the connected region from the depth image, then determining the principal direction of the connected region via the PCA method, afterwards calculating the real width and the real length of the connected region, then determining the segmentation position according to heuristic characteristics and finally acquiring the image of the hand from the connected region. For example, for the human hand, as mentioned above, the heuristic characteristics include: the reference width of the hand, the reference length of the hand, the variation trend of the width of the connected region where the hand is located in the principal direction, the fact that a null value occurs at a reference position unsuitable as the segmentation position and causes a large difference between the coordinate difference of pixel points farthest away from each other at the reference position and the number of pixel points at the reference position, and the fact that a reference position is not suitable as the segmentation position in a situation where the distance from the reference position to another reference position unsuitable as the segmentation position is smaller than or equal to the preset distance (for example, 24 mm-26 mm), and so on.

Figure 12:
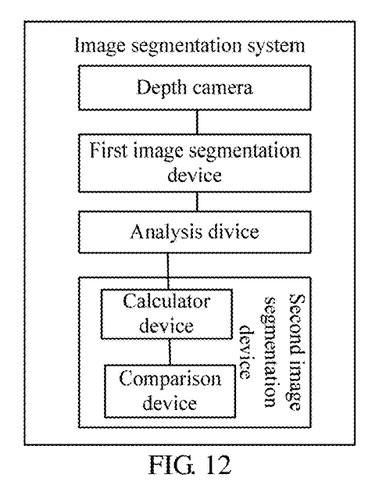
FIG. 12 is a structural block diagram of an image segmentation system according to the embodiments of the present disclosure.

At least one embodiment of the present disclosure further provides an image segmentation system, as shown in FIG. 12, the image segmentation system includes: a first image segmentation device configured to process a depth image to obtain a connected region where a target object is located from the depth image; an analysis device connected to the first image segmentation device and configured to determine a principal direction or a secondary direction of the connected region acquired by the first image segmentation device by a principal component analysis method; and a second image segmentation device connected to the analysis device and configured to acquire an image of the target object (for example, a hand) from the connected region according to relationship between morphology of the target object and the principal direction or the secondary direction.

For example, the second image segmentation device includes a calculator device connected to the analysis device and a comparison device connected to the calculator device.

For example, the calculator device is configured to calculate pixel-point numbers respectively at a plurality of positions in the connected region and to determine a variation trend of the point-pixel numbers along the principal direction, pixel points at each of the plurality of positions are sequentially arranged along the secondary direction of the connected region, and the secondary direction is perpendicular to the principal direction; and accordingly, the comparison device is configured to compare the variation trend with a variation trend of the morphology of the target object along the principal direction, to determine a segmentation position for acquiring the image of the target object in the connected region.

For example, the calculator device is configured to calculate a real width of the connected region along the secondary direction at each of a plurality of positions, the secondary direction is perpendicular to the principal direction, the plurality of positions are sequentially arranged along the principal direction, and the pixel points at each of the plurality of positions are sequentially arranged along the secondary direction; and accordingly, the comparison device is configured to compare the real width with a reference width to determine a segmentation position for acquiring the image of the target object in the connected region. For example, in a situation where the target object is a human hand, the reference width is from 40 mm to 100 mm, for example, 40 mm, 80 mm or 100 mm.

For example, the calculator device is configured not only to determine the variation trend of the point-pixel numbers along the principal direction, but also to determine the real width of the connected region along the secondary direction at each of the plurality of positions; and accordingly, the comparison device is configured not only to compare the variation trend of the point-pixel numbers along the principal direction with the variation trend of the morphology of the target object along the principal direction, but also to compare the real width of the connected region at each of the plurality of positions with the reference width, to determine the segmentation position.

For example, the calculator device is further configured to calculate a real distance from each of the plurality of positions to a vertex of the connected region, and the comparison device is accordingly further configured to compare the real distance with a reference length to determine the segmentation position. For example, in a situation where the target object is a human hand, the reference length is from 40 mm to 200 mm.

For example, the image segmentation system further includes a depth camera configured to acquire the depth image and to output the depth image to the first image segmentation device.

For the functions of each device in the image segmentation system according to the embodiments of the present disclosure, reference may be made to the related description in the embodiments of the image segmentation method described above.

For example, each of the specific structures of the first image segmentation device, the analysis device, the second image segmentation device, the calculator device, and the comparison device in the image segmentation system is a processor, such as a processor comprising hardware. For example, the processor is an electronic component or a collection of electronic components having a processing function such as a central processing unit (CPU), a micro controller unit (MCU), a digital signal processing (DSP), or a programmable logic controller (PLC).

In addition, the above devices in the embodiments of the present disclosure may all be integrated in one processor or may be implemented by different processors respectively, or any two or more devices may be integrated in one processor. The above devices may be implemented in the form of hardware, or may be implemented in the form of hardware plus software functional unit.

Figure 13:
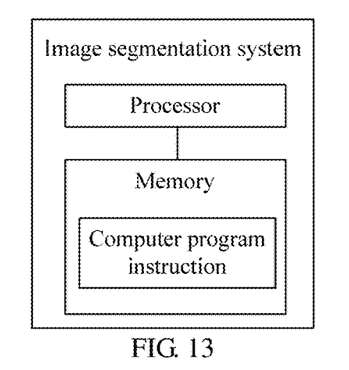
FIG. 13 is a structural block diagram of another image segmentation system according to the embodiments of the present disclosure.

At least one embodiment of the present disclosure further provides another image segmentation system, as illustrated in FIG. 13, the image segmentation system includes a processor, a memory and a computer program instruction stored in the memory, the computer program instruction executes following steps in a situation where the computer program instruction is executed by the processor: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

For example, the memory includes at least one of read-only memory and random access memory and provides instructions and data to the processor. For example, a portion of the memory also includes non-volatile random access memory (NVRAM).

The processor may be a general purpose processor, a digital signal processor (DSP), an application specific integrated circuit (ASIC), a field programmable gate array (FPGA) or other programmable logic device, discrete gate or transistor logic, discrete hardware components. The general purpose processor may be a microprocessor or any conventional processor or the like.

For example, the image segmentation system further includes a depth camera configured to acquire the depth image and to output the depth image to the first image segmentation device.

At least one embodiment of the present disclosure further provides a storage medium in which a computer program instruction is stored, and the computer program instruction is adapted to be loaded and executed by a processor to execute following steps: obtaining a connected region where a target object is located from a depth image; determining a principal direction or a secondary direction of the connected region by a principal component analysis method; and acquiring an image of the target object from the connected region according to relationship between morphology of the target object and the principal direction or the secondary direction.

For example, the storage medium may be a semiconductor memory, a magnetic surface memory, a laser memory, a random access memory, a read only memory, a serial access memory, a non-permanent memory, a permanent memory, or any other form of storage medium well known in the art.

For example, the processor may be a general purpose processor, a digital signal processor (DSP), an application specific integrated circuit (ASIC), a field programmable gate array (FPGA) or other programmable logic device, discrete gate or transistor logic, discrete hardware components. The general purpose processor may be a microprocessor or any conventional processor or the like.

At least one embodiment of the present disclosure further provides an apparatus which includes the image segmentation system described in any one of the above embodiments or the storage medium described above.

For example, the apparatus is a human-machine interaction device such as an AR smart glasses or a display. The device acquires an image including an instruction of a user (for example, the image of the target object) by using the image segmentation system included in the apparatus, and realizes the human-computer interaction by analyzing and processing the image.

The embodiments of the image segmentation method, the image segmentation system, the storage medium, and the apparatus including the image segmentation system or the storage medium may refer to each other. In addition, the embodiments of the present disclosure and the features in the embodiments may be combined with each other in case of no conflict.

What are described above is related to the illustrative embodiments of the disclosure only and not limitative to the scope of the disclosure; the scopes of the disclosure are defined by the accompanying claims.

This application claims the benefit of Chinese Patent Application No. 201610905435.X filed on Oct. 17, 2016, which is hereby entirely incorporated by reference as a part of the present application.

What is claimed is:

1. An image segmentation method, comprising:
   obtaining a connected region where a target object is located from a depth image;
   determining a principal direction or a secondary direction of the connected region by a principal component analysis method; and
   acquiring an image of the target object from the connected region according to a relationship between a morphology of the target object and the principal direction or the secondary direction, wherein the acquiring the image of the target object comprises:

determining a variation trend of pixel-point numbers respectively at a plurality of positions in the connected region along the principal direction, wherein pixel points at each of the plurality of positions are sequentially arranged along the secondary direction of the connected region, and the secondary direction is perpendicular to the principal direction;

comparing the variation trend with a variation trend of the morphology of the target object along the principal direction; and determining a segmentation position for acquiring the image of the target object in the connected region according to a comparison result.

2. The method according to claim 1, wherein the obtaining the connected region where the target object is located from the depth image comprises:

detecting all connected regions in the depth image and a same parameter of each of the connected regions; and taking a connected region having a preset parameter as the connected region where the target object is located.

3. The method according to claim 2, wherein the same parameter is a minimum depth value, and the preset parameter is a minimum depth value which is smallest among minimum depth values of the connected regions.

4. The method according to claim 1, further comprising:

step S11: taking a preset pixel point in the depth image as an initial point and adding the preset pixel point to a preset queue;

step S12: determining a neighboring pixel point that is spatially adjacent to the initial point;

step S13: calculating an absolute value of a depth difference between the neighboring pixel point and the initial point, wherein in a situation where the absolute value of the depth difference is smaller than or equal to a preset depth difference, the neighboring pixel point is added to a connected region where the initial point is located;

step S14: taking the neighboring pixel point as a next initial point and adding the neighboring pixel point to the preset queue; and repeating the above step S12 to step S14 to determine the connected region where the initial point is located.

5. The method according to claim 4, wherein the preset depth difference is from 10 mm to 15 mm.

6. The method according to claim 1, wherein the acquiring the image of the target object further comprises:

determining a real distance from each of the plurality of positions to a vertex of the connected region; and comparing the real distance with a reference length to determine the segmentation position.

7. The method according to claim 6, wherein the target object is a human hand, and the reference length is from 40 mm to 200 mm.

8. The method according to claim 6, wherein according to a difference between average depth values of and a real distance along the principal direction of each group of two adjacent ones of the positions between each of the plurality of positions and the vertex of the connected region, a real distance from each of the plurality of positions to the vertex of the connected region is determined.

9. The method according to claim 1, wherein the acquiring the image of the target object comprises:

determining a real width of the connected region along the secondary direction at each of the plurality of positions; and comparing the real width with a reference width to determine the segmentation position for acquiring the image of the target object in the connected region.

10. The method according to claim 9, wherein the target object is a human hand, and the reference width is from 40 mm to 100 mm.

11. The method according to claim 9, wherein according to a number of the pixel points at each of the plurality of positions, an average depth value of the pixel points at each of the plurality of positions, and a focal distance ratio of a camera for acquiring the depth image, the real width of the connected region at each of the plurality of positions is determined.

12. The method according to claim 9, wherein the acquiring the image of the target object further comprises:

obtaining a plurality of reference positions among the plurality of positions;

calculating a difference between coordinates of two pixel points which are farthest away from each other at each of the reference positions; and determining the segment position according to a size relationship between the difference and a number of pixel points at each of the reference positions.

13. The method according to claim 12, wherein the plurality of reference positions comprises a first reference position and a second reference position, a difference between coordinates of two pixel points farthest away from each other at the first reference position is $\Delta X1$, which is greater than 0, and a number of pixel points at the first reference position is $N1$, and in a situation where $(\Delta X1-N1)/N1$ is smaller than or equal to a preset value, which is from 10% to 15%, the first reference position is taken as the segmentation position.

14. The method according to claim 13, wherein a difference between coordinates of two pixel points farthest away from each other at the second reference position is $\Delta X2$, which is greater than 0, and a number of pixel points at the second reference position is $N2$, and in a situation where $(\Delta X2-N2)/N2$ is greater than the preset value, a distance from the segmentation position to the second reference position is greater than a preset distance, and the preset distance is from 24 mm to 26 mm.

15. An image segmentation system, comprising:

a first image segmentation device configured to process a depth image to obtain a connected region where a target object is located from the depth image;

an analysis device connected to the first image segmentation device and configured to determine a principal direction or a secondary direction of the connected region acquired by the first image segmentation device by a principal component analysis method; and a second image segmentation device connected to the analysis device and configured to acquire an image of the target object from the connected region according to relationship between morphology of the target object and the principal direction or the secondary direction, wherein the second image segmentation device comprises:

a calculator device connected to the analysis device and configured to calculate pixel-point numbers respectively at a plurality of positions in the connected region and to determine a variation trend of the pixel-point numbers along the principal direction, in which pixel points at each of the plurality of positions are sequentially arranged along the secondary direction of the connected region, and the secondary direction is perpendicular to the principal direction; and a comparison device connected to the calculator device and configured to compare the variation trend with a variation trend of the morphology of the target object along the principal direction, to determine a segmentation position for acquiring the image of the target object in the connected region.

16. The system according to claim 15, wherein the calculator device is further configured to calculate a real width of the connected region along the secondary direction at each of the plurality of positons; and the comparison device is further configured to compare the real width with a reference width to determine the segmentation position for acquiring the image of the target object in the connected region.

17. An apparatus, comprising the image segmentation system according to claim 15.

18. An image segmentation method, comprising:

obtaining a connected region where a target object is located from a depth image;

determining a principal direction or a secondary direction of the connected region by a principal component analysis method; and acquiring an image of the target object from the connected region according to a relationship between a morphology of the target object and the principal direction or the secondary direction, wherein the acquiring the image of the target object comprises:

determining a real width of the connected region along the secondary direction at each of a plurality of positions, wherein the secondary direction is perpendicular to the principal direction, the plurality of positions are sequentially arranged along the principal direction, and pixel points at each of the plurality of positions are sequentially arranged along the secondary direction; and comparing the real width with a reference width to determine a segmentation position for acquiring the image of the target object in the connected region.

* * * * *